United States Patent
Beckett et al.

[19]

[11] Patent Number: 5,983,276
[45] Date of Patent: Nov. 9, 1999

[54] ACKNOWLEDGEMENT TRACKING AND AUTOMATIC FAXING SYSTEM OF EDI TRANSACTIONS ON THE INTERNET

[75] Inventors: Cynthia F. Beckett, Livermore; Deepak Alur, Milpitas; Mats Jansson, Redwood City; Virginia C. Hyde, Santa Clara, all of Calif.

[73] Assignee: Sun Microsystems, Inc., Palo Alto, Calif.

[21] Appl. No.: 08/834,809

[22] Filed: Mar. 31, 1997

[51] Int. Cl.⁶ .................................................. G06F 13/00
[52] U.S. Cl. .......................... 709/232; 709/237; 709/200
[58] Field of Search .......................... 395/200.3, 200.62, 395/200.67; 709/200, 232, 237

[56] References Cited

U.S. PATENT DOCUMENTS

| | | | |
|---|---|---|---|
| 5,369,686 | 11/1994 | Dutra et al. ................................ | 379/94 |
| 5,557,780 | 9/1996 | Edwards et al. . | |
| 5,590,196 | 12/1996 | Moreau ..................... | 380/18 |
| 5,608,874 | 3/1997 | Ogawa et al. ..................... | 395/200.15 |
| 5,715,397 | 2/1998 | Ogawa et al. ..................... | 395/200.18 |
| 5,761,415 | 6/1998 | Joseph et al. ......................... | 395/200.3 |
| 5,774,479 | 6/1998 | Lee et al. .................................. | 371/33 |
| 5,778,198 | 7/1998 | Kadota .................... | 395/286 |
| 5,781,190 | 7/1998 | Gorbet et al. ............................ | 345/335 |
| 5,805,810 | 9/1998 | Maxwell ............................ | 395/200.36 |
| 5,812,669 | 9/1998 | Jenkins et al. ............................. | 380/25 |

FOREIGN PATENT DOCUMENTS

| | | |
|---|---|---|
| 0 506 592 A1 | 9/1992 | European Pat. Off. . |
| WO 93/07566 | 4/1993 | WIPO . |
| WO 96/09710 | 3/1996 | WIPO . |

*Primary Examiner*—Krisna Lim
*Attorney, Agent, or Firm*—Skjerven, Morrill, MacPherson, Franklin & Friel LLP; Fabio E. Marino; Paul E. Lewkowicz

[57] ABSTRACT

A method and apparatus for performing reliable data transfer operations over a global computer network are provided. This is accomplished by transmitting data stored on a first computer system connected to the global computer network to a second computer system connected to the global computer network, sending a receipt acknowledgment signal to the first computer system when the data is received on the second computer system, monitoring acknowledgment signals received by the first computer system, and automatically transmitting the data via facsimile if the receipt of the data is not acknowledged within a predetermined time period. In addition, a paging signal is automatically transmitted to a the business partner to indicate that the data has been transferred by facsimile. Unlike prior art techniques, in which data transfers are performed in batch off-line, embodiments of the invention allow for secure data transfer operations to be performed on-line in real-time. In addition, since a global computer network is utilized, there is no need to maintain a dedicated communication line between the first and the second computer systems, but rather a single network connection can be used by the first and the second computer systems to communicate with any number of computer systems connected to the global computer network.

9 Claims, 8 Drawing Sheets

ACKNOWLEDGEMENT TRACKING AND AUTOMATIC FAXING SYSTEM OF EDI TRANSACTIONS ON THE INTERNET

BACKGROUND OF THE INVENTION

1. Field of the Invention

The present invention relates generally to EDI transactions and, more particularly, to a method of performing EDI transactions over the Internet.

2. Related Art

Data transfer among business partners are commonly used to allow automated or semi-automated sharing of information by companies that provide related services. For example, when a manufacturer contracts out repair and service orders to independent service providers, data describing the service order placed by the client with the manufacturer needs to be transmitted to the independent service provider. In addition, data appraising the manufacturer of the progress of the service call must be transmitted back to the manufacturer by the independent service provider to allow the manufacturer to keep accurate records.

Current systems for transferring data relating to service orders between business partners perform the data transfers either over a direct connection between the business partners or via a third party communication partner. However, maintaining a direct connection between business partners is expensive, since a dedicated line is maintained between the partners. Often the data transfer volume among the business partners is not sufficient to amortize the cost of maintaining a dedicated line. To reduce costs, data transfers are thus performed via a third party communication partner. The third party communication partner performs data transfers more economically, as it provides the same service for a large number of clients. Third party communication partners, however, typically perform data transfers in batch overnight. As a result, a typical turnaround time for servicing a call via an independent service provider requires several working days. This is undesirable in environments which require prompt response to service calls. Accordingly, there is a need for an inexpensive method and apparatus of transferring data among business partners which allows for fast turnaround of service calls.

SUMMARY OF THE INVENTION

In accordance with an embodiment of the present invention a method and apparatus for performing reliable data transfer operations over a global computer network are provided. This is accomplished by transmitting data stored on a first computer system connected to the global computer network to a second computer system connected to the global computer network, sending a receipt acknowledgment signal to the first computer system when the data is received on the second computer system, monitoring acknowledgment signals received by the first computer system, and automatically transmitting the data via facsimile if the receipt of the data is not acknowledged within a predetermined time period. In addition, a paging signal is automatically transmitted to a business partner to indicate that the data has been transferred by facsimile.

Unlike prior art techniques, in which data transfers are performed in batch off-line, embodiments of the invention allow for secure data transfer operations to be performed on-line in real-time. In addition, since a global computer network is utilized, there is no need to maintain a dedicated communication line between the first and the second computer system, but rather a single network connection can be used by the first and the second computer system to communicate with any number of computer systems connected to the global computer network.

DETAILED DESCRIPTION OF THE INVENTION

Figure 1A:
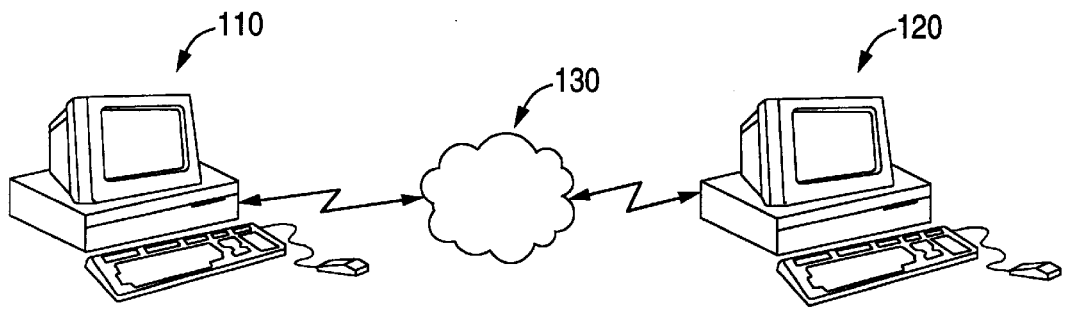
FIG. 1A is a block diagram of a data transfer system according to one embodiment of the invention.
Figure 1B:
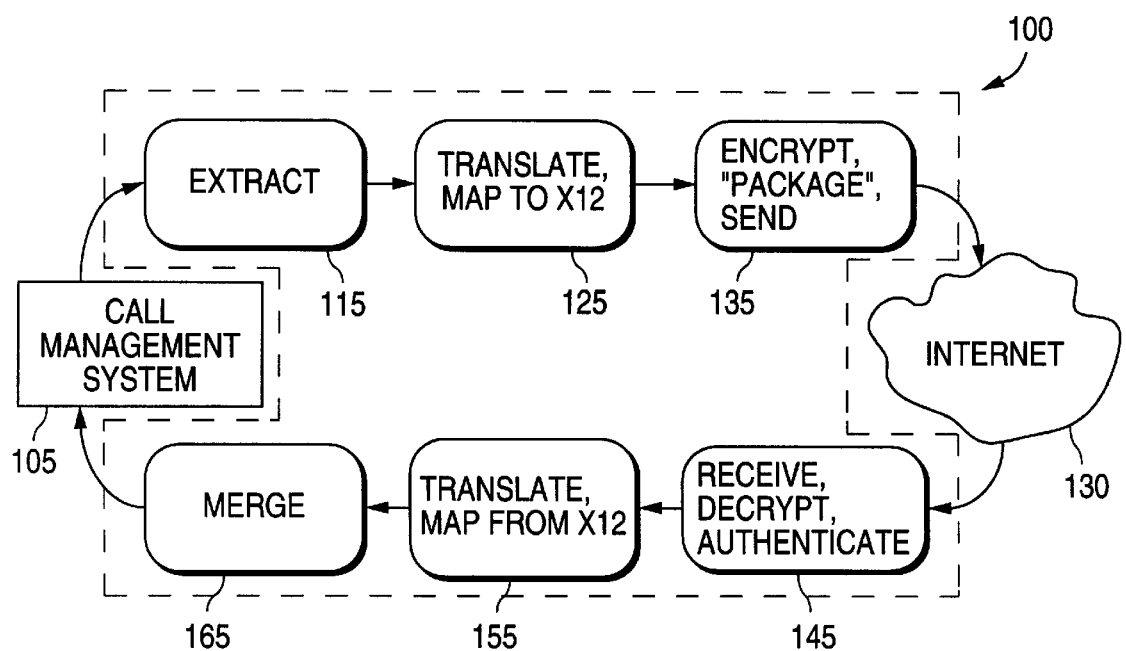
FIG. 1B is a block diagram of a data transfer module of transmitting computer 110 or receiving computer 120 of FIG. 1A.

A method and apparatus in accordance to an embodiment of the invention perform data transfer operations between computer systems connected to a global computer network, such as the Internet. FIGS. 1A–1B illustrate the structure of a data transfer system according to one embodiment of the invention.

In FIG. 1A, a computer 110 is connected to a computer 120 via a global network 130. Data is transferred between computer 110 and computer 120 via the global network 130. Computers 110 and 120 can be any general purpose or special purpose computer known in the art. For example, in some embodiments computers 110 and 120 are personal computers running a variety of software applications, while in other embodiments computers 110 and 120 are dedicated workstations. Global network 130 is any global network known in the art. For example, in the preferred embodiment of the invention, the global network 130 is the Internet. The Internet is described in "Computer Networks: Third Edition" by Andrew S. Tanenbaum (Upper Saddle River, N.J.: Prentice-Hall 1996), which is herein incorporated by reference in its entirety.

FIG. 1B illustrates the structure of a data transfer module 100 of computers 110 and 120. Computers 110 and 120 have a call management system 105. Call management system 105 can be any suitable system known in the art to administer service orders. While call management system 105 is described herein as part of computers 110 and 120, call management system 105 can be part of a separate computer system which communicates with computers 110 or 120. Furthermore, computers 110 and 120 can use different call management systems 105. In particular, call management systems 105 of computers 110 and 120 may use different data formats to represent service orders.

Data transfer module 100 of computer 110 or 120 translates the data retrieved from the call management system 105 of computer 110 or 120, encrypts the data extracted from the database to ensure secure data transfer, and transmits the encrypted data to the other of computers 110 or 120. The data transfer module 100 of the receiving computer 110 or 120, in turn, decrypts the data received over global network 130 and translates the decrypted data into a format compatible with the call management system 105 of the receiving computer 110 or 120. As explained more fully below, receiving computer 110 or 120 then sends an acknowledgment signal back to the transmitting computer 110 or 120, to allow detection of data transfer failures.

The data transfer module 100, shown in FIG. 1B, uses an extraction module 115, an outbound translation module 125 and an encryption module 135, to handle outgoing data transfers. In addition, the data transfer module 100 uses a decryption module 145, an inbound translation module 155, and a merge module 165 to handle incoming data transfers.

According to one embodiment of the invention, a first computer system, running under the Solaris v. 5.4 operating system available from Sun Microsystems, Inc. of Mountain View, Calif., communicates with a second computer system running either under the Solaris operating system or under a different operating system via the Internet, as shown in FIGS. 2A–3B. Each computer system uses a number of modules to transfer data to and from the other computer system. In order to service a service call, the data transfer system supports four types of operations: call initiation (CI), call update (CU), status update (SU) and call closure (CC). A call initiation operation entails entering a service order into the first computer system via a call management tool such as the SOTOOL v. 2.4.4e program, available from Sun Microsystems, Inc. of Mountain View, Calif. Service orders are then assigned to a business partner. This is reflected on the SOTOOL module 203 by entering a partner code value into an assignment field. Once the service order information has been entered into the system via SOTOOL 203, the data is stored in the CMSDB database 201. If the information stored in the CMSDB database is incomplete, a status field is used to indicate that further action is required before the service call data can be transmitted to a business partner.

A call update operation is similar to a call initiation operation, except that it is presumed that data for the service call has already been transmitted via a call initiation operation. As a result, only data that has changed and needs to be updated on the business partner's database is transmitted.

A status update operation, on the other hand, entails receiving data back from the business partner reporting on the status of the service call. The data received is merged into CMSDB database 201 to allow further processing by SOTOOL 203, such as displaying a correct status field.

Finally, a call closure operation entails receiving from the business partner data relating to the final resolution of the service call. The information received by the service partner is then merged into CMSDB database 201 to allow SOTOOL 203 to correctly handle the resolution of the service call. A call closure operation is expected for each call initiation operation.

Figure 2A:
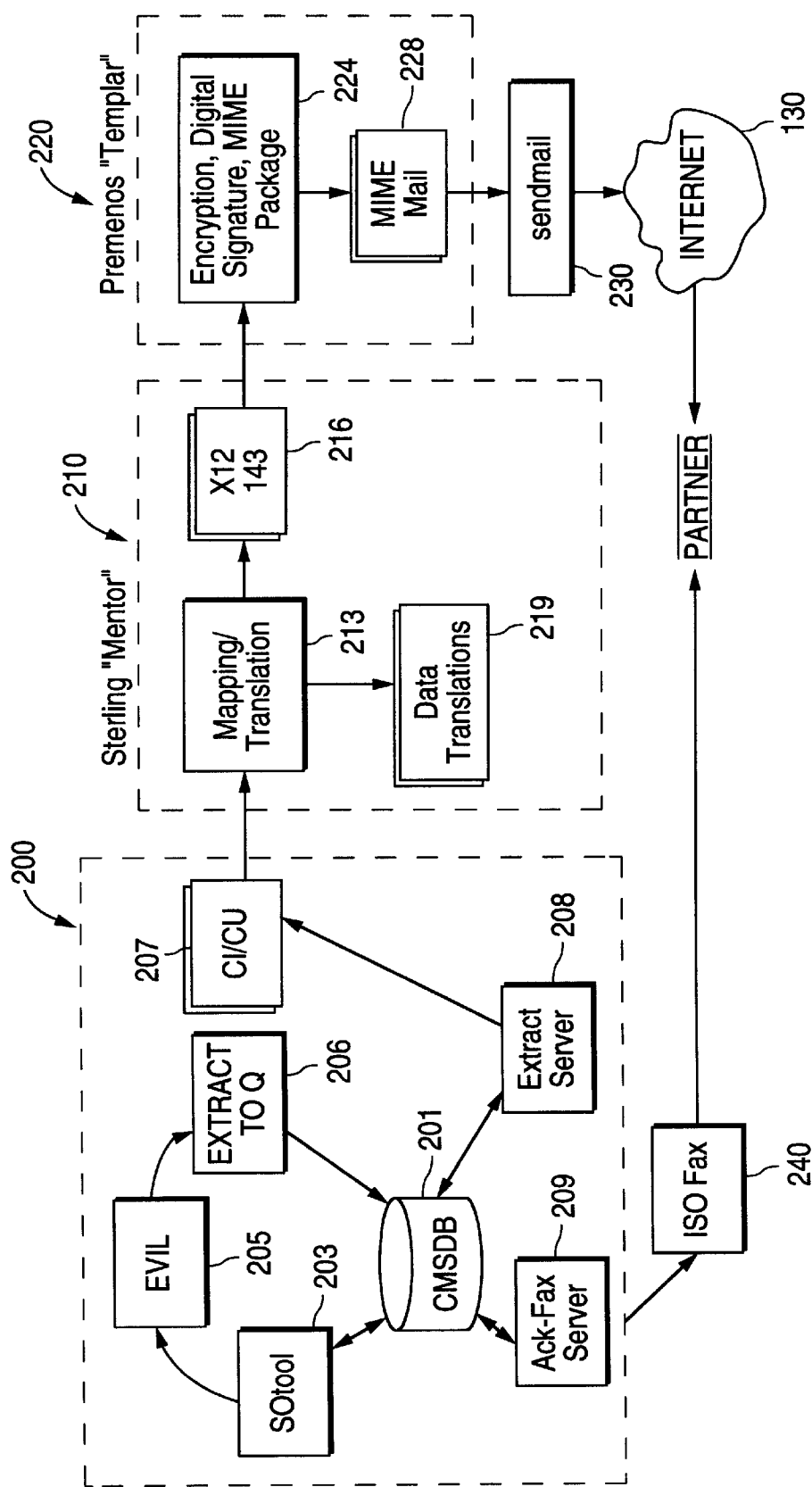
FIG. 2A is a block diagram of the process of extracting data from a database of a call management system of a first computer system, translating it into a predetermined format, encrypting the formatted data and transmitting the encrypted data to a second computer system over the Internet.
Figure 2B:
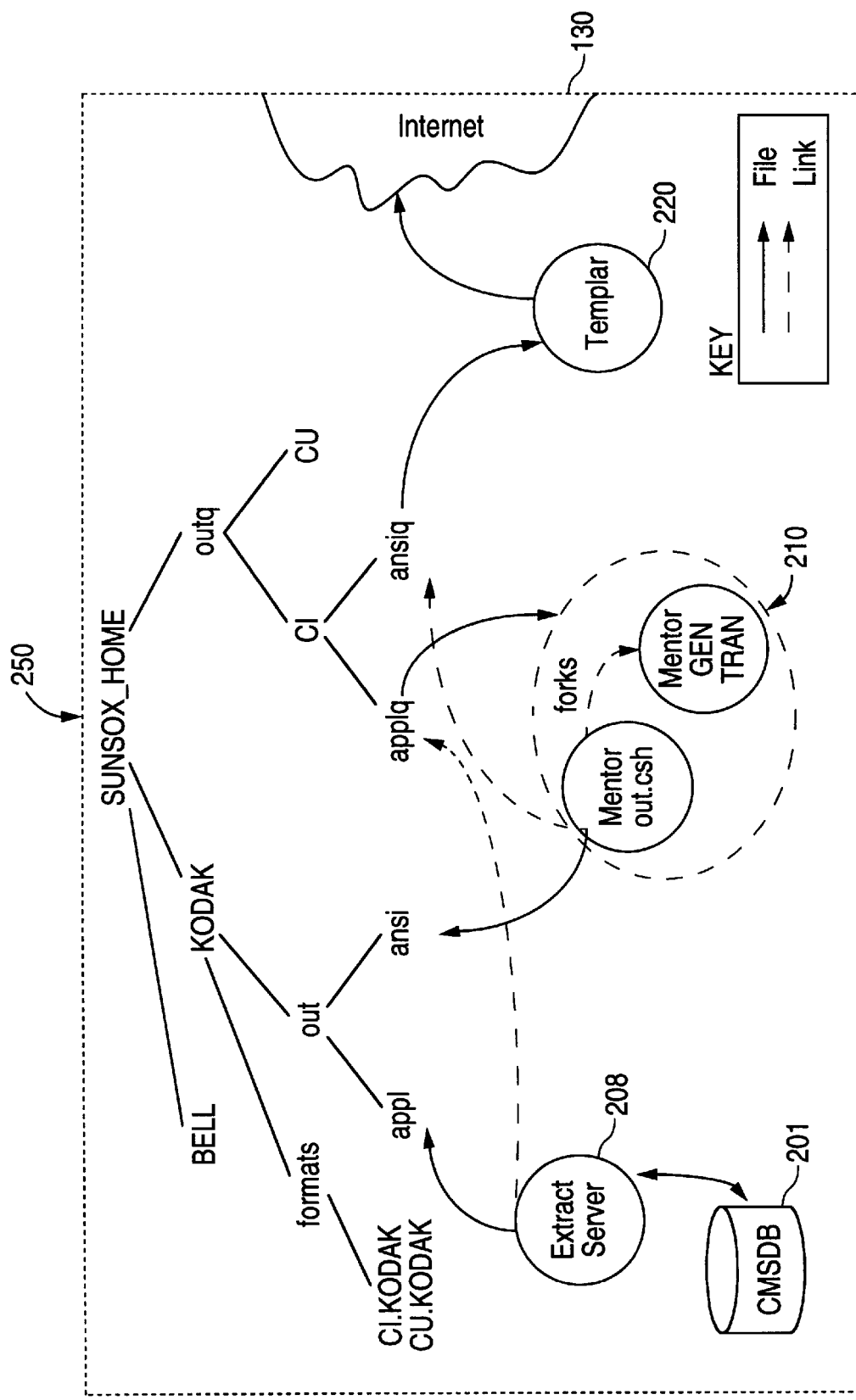
FIG. 2B is a functional diagram illustrating the relationship of files stored and processes executed on the first computer system of FIG. 2A.
Figure 3A:
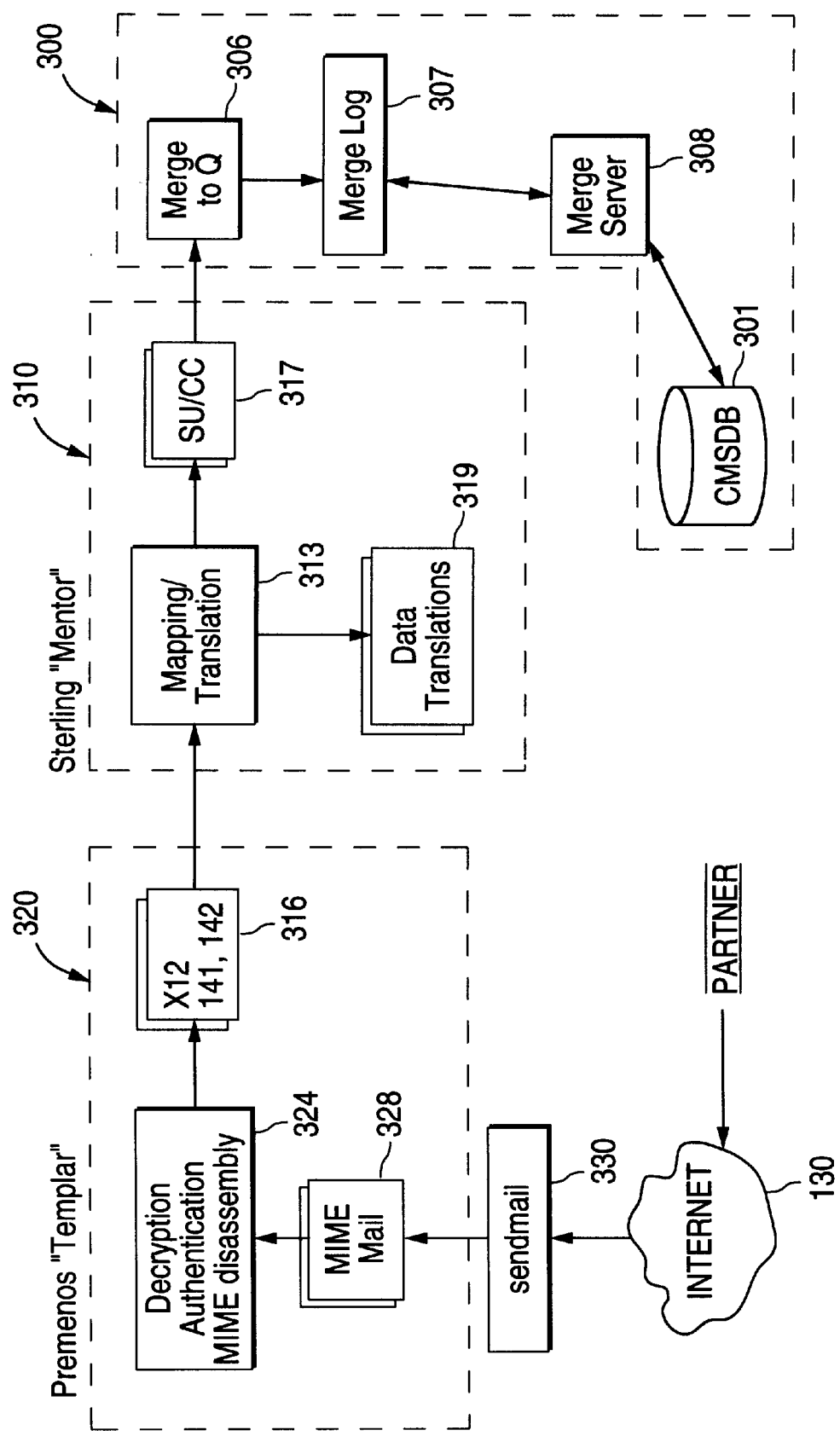
FIG. 3A is a block diagram of the process of receiving on a second computer system data transmitted over the Internet by the first computer system of FIGS. 2A–2B, decrypting the encrypted data, translating the decrypted data into a format compatible with a call management system running on the second computer, and storing the reformatted data into a database of the second computer system.
Figure 3B:
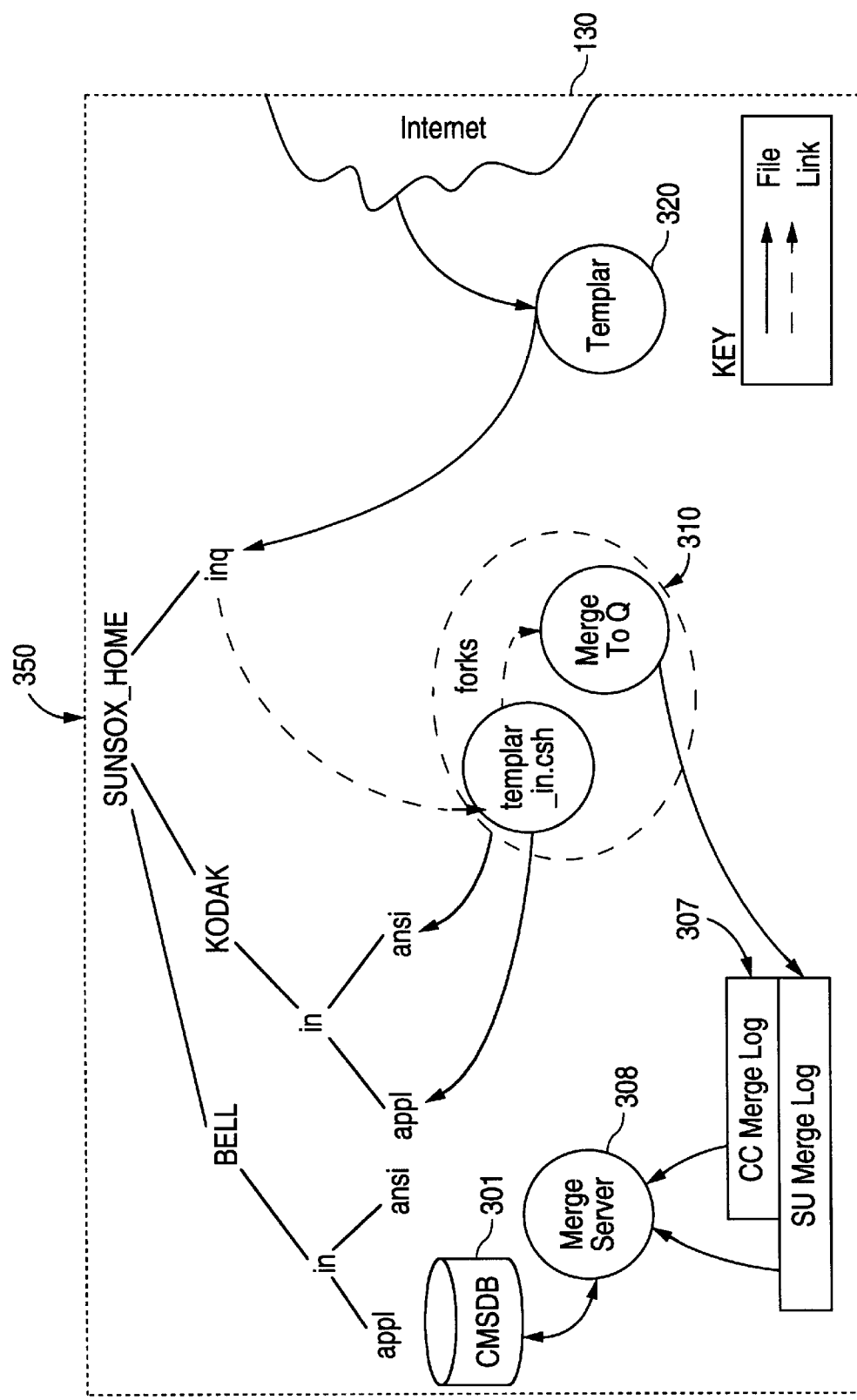
FIG. 3B is a functional diagram illustrating the relationship of files stored and processes executed on the second computer system of FIG. 3A.

Using as a reference the first computer system, FIGS. 2A–2B illustrate the outbound process of transferring data from the first computer system to the second computer system, which is used for call initiation and call update operations. FIGS. 3A–3B illustrate the inbound process of receiving data from the second computer system onto the first computer system, which is used for status update and call closure operations.

FIG. 2A illustrates the functional components of a data transfer module of the computer system used in the outbound portion of the data transfer operation of FIG. 1B. The data transfer module has a call management system 200, a translation module 210, an encryption module 220, a sendmail module 230 and an ISO fax module 240. The call management system 200, in turn, has a CMSDB database 201, an SOTOOL module 203, an EVIL (Edit Validation Interpretive Language) module 205, and Extract to Q module 206, CI/CU files 207, an Extract server 208 and a Ack-Fax Server 209. The translation module 220 has a Mapping/Translation module 213, X12.143 files 216 and data translations files 219. Finally, encryption module 220 has encryption/MIME module 224 and MIME mail files 228. The operation of these modules is set forth below.

Initially, a service call is setup on call management system 200 using SOTOOL 203. SOTOOL 203 has a graphical user interface portion that allows a user of the computer system to enter, view and update information stored in the CMSDB database 201. Data entered into CMSDB database 201 using SOTOOL 203 is then validated using EVIL module 205. EVIL module 205 is a computer process executed by the computer system which verifies whether the data stored in CMSDB database 201 is in a valid format for transmission to the business partner designated by the partner code in the assignment field. If the data validation operation is successful, EVIL module 205 invokes Extract to Q module 206 which records the data in an extract queue (not shown) to indicate that the data is ready to be sent to the business partner.

Extract server module 208, in turn, monitors the extract queue and when data is present in the queue extracts the data from the CMSDB database 201 and stores it into a flat file CI/CU 207 to be serviced by translation module 210. Translation module 210 is a computer process executed by the computer system that translates a flat data file into a predetermined, standardized format. The MENTOR v. 1.2-7 program, available from Sterling Software, Inc. of Dublin, Ohio is suitable for use in the present invention to implement translation module 210. Those skilled in the art will appreciate that any suitable translation program known in the art can be used in place of the MENTOR program. Mapping/Translation module 213, in turn, reads a flat file CI/CU 207 generated by Extract server module 208 and translates it into an X12.143 file 216. X12.143 file 216 is a file formatted according to the ANSI X12 standard set by the American National Standards Institute. A copy of the translated data is also stored in a data translations file 219, to be used recovering from a failure of the data transmission operation.

Encryption/MIME module 224, in turn, encrypts X12.143 file 216 using well known encryption methods. For example, in the preferred embodiment the file is encrypted using the Data Encryption Standard (DES) method and the key is encrypted using the Rivest Shamir Adelman (RSA) method. The TEMPLAR v. 1.4 program available from Premenos, Corp. of Concordia, Calif. is an encryption package suitable for use in the present invention to implement encryption module 220. Those skilled in the art will appreciate that any suitable encryption program can be used in place of the TEMPLAR program.

The encrypted file is then packaged using MIT's Multi-purpose Internet Mail Extensions protocol to generate a MIME mail file 228. MIME mail file 228 is then transmitted over Internet 130 by sendmail module 230.

FIG. 2B illustrates the structure of file system 250 and the processes executed by the computer system during the operation described with respect to FIG. 2A. First, a format file (e.g., CI.KODAK or CU.KODAK) is read from directory $SUNSOX_HOME/<partner>/out/formats, where <partner> is the name of a directory assigned to the files regarding a specific business partner. Those skilled in the art will appreciate that while a UNIX file system is described for clarity, the present invention is not limited to a computer system running under any particular operating system. The UNIX file system is described in "The UNIX Programming Environment" by Brian W. Kernighan and Rob Pike (Englewood Cliffs, N.J.: Prentice-Hall 1984), which is herein incorporated by reference in its entirety. The format files are used to specify which data is to be extracted from CMSDB database 201 to meet the requirements of each business partner. The advantage of using format files is that when a business partner's requirements change only the format file for that partner needs to be modified, and not the Extract server 208.

Two flat files containing data extracted from CMSDB database 201 according to the format file are written to directory ./appl/CI (or ./appl/CU) and temporarily linked to $SUNSOX_HOME/outq/CI/applq (or $SUNSOX_HOME/outq/CU/applq). The copy in the $SUNSOX_HOME/outq/CI/applq (or $SUNSOX_HOME/outq/CU/applq) directory is deleted after the translation operation is completed, while the copy in ./appl/CI (or ./appl/CU) is saved for archival purposes.

Translation module 210, in turn, writes X12.143 file 216 into directory ./ansi/CI (or ./ansi/CU) and temporarily links it to directory $SUNSOX_HOME/outq/CI/ansiq (or $SUNSOX_HOME/outq/CU/ansiq). As with the extracted data files, the copy in the directory $SUNSOX_HOME/outq/CI/ansiq (or $SUNSOX_HOME/outq/CU/ansiq) is deleted after the encryption operation is completed, while the copy in ./ansi/CI (or ./ansi/CU) is saved for archival purposes. Encryption module 210 also maintains log and backup files.

FIG. 3A illustrates the functional components of a data transfer module of the computer system used in the inbound portion of the data transfer operation of FIG. 1B. The data transfer module has a sendmail module 330, a decryption module 320, a translation module 310, and a call management system 300. Decryption module 320, in turn, has a MIME mail module 328, a decryption/MIME module 324, and an X12.141,142 file 316. Translation module 310 has a mapping/translation module 313, data translations files 319 and SU/CC files 317. Finally, the call management system 300 has a Merge to Q module 306, a Merge log 307, a Merge server 308, and a CMSDB database 301. The operation of these modules is set forth below.

Initially, data packaged according to the MIME format is received over the Internet 130 by sendmail module 330. Sendmail module 330, in turn, generates a MIME mail file 328. Decryption/MIME module 324 unpackages, authenticates and decrypts MIME mail file 328 and generates an X12.142,143 file 316. The unpackaging operation entails decoding the MIME encoded data. The authentication operation entails verifying that the data transferred over the Internet 130 has not been corrupted. The decryption operations entails decrypting the data encrypted using DES and RSA, as described with reference to FIG. 2A. As those skilled in the art are familiar with these techniques, they are not further described herein.

Mapping/translation module 313, in turn, translates X12.141,142 file 316 into a format compatible with CMSDB database 301. ANSI X12 version 141 is used for status update (SU) operations, while ANSI X12 version 142 is used for call closure (CC) operations. Mapping/translation module 313 stores the translated data in an SU/CC file 317. A copy of the translated data is also stored in a data translations file 319, to be used in recovering from a failure of the data transfer operation.

Merge to Q module 306, in turn, records the data in SU/CC file 317 in Merge log 307 to indicate that the translated data is to be merged into the CMSDB database 301. Merge server 308 monitors Merge log 307 and when data is present in the Merge Log 307 merges the data into CMSDB database 301.

FIG. 3B illustrates the structure of file system 350 and the processes executed by the computer system during the operation described with respect to FIG. 3A. First, decryption module 320 translates MIME mail file 328 received over the Internet 130 and stores the results into X12.141,142 file 316 in directory $SUNSOX_HOME/inq. Then, X12.141,142 file 316 is copied into directory ./ansi and temporarily linked to $SUNSOX_HOME/<partner>/in/ansi. Translation module 310 translates the x12.141,242 file 316 and writes the results of the translation into SU/CC file 317 which is stored in directory ./appl and temporarily linked to directory $SUNSOX_HOME/<partner>/in/appl. Finally, translation module 310 updates Merge log 307. Upon completion of the translation operation, the X12.141,142 file 316 stored in directory $SUNSOX_HOME/inq is deleted. The temporary links to directories $SUNSOX_HOME/<partner>/in/ansi and $SUNSOX_HOME/<partner>/in/appl are also removed, while the files stored in directories ./ansi and ./appl are saved for archival purposes.

Figure 4:
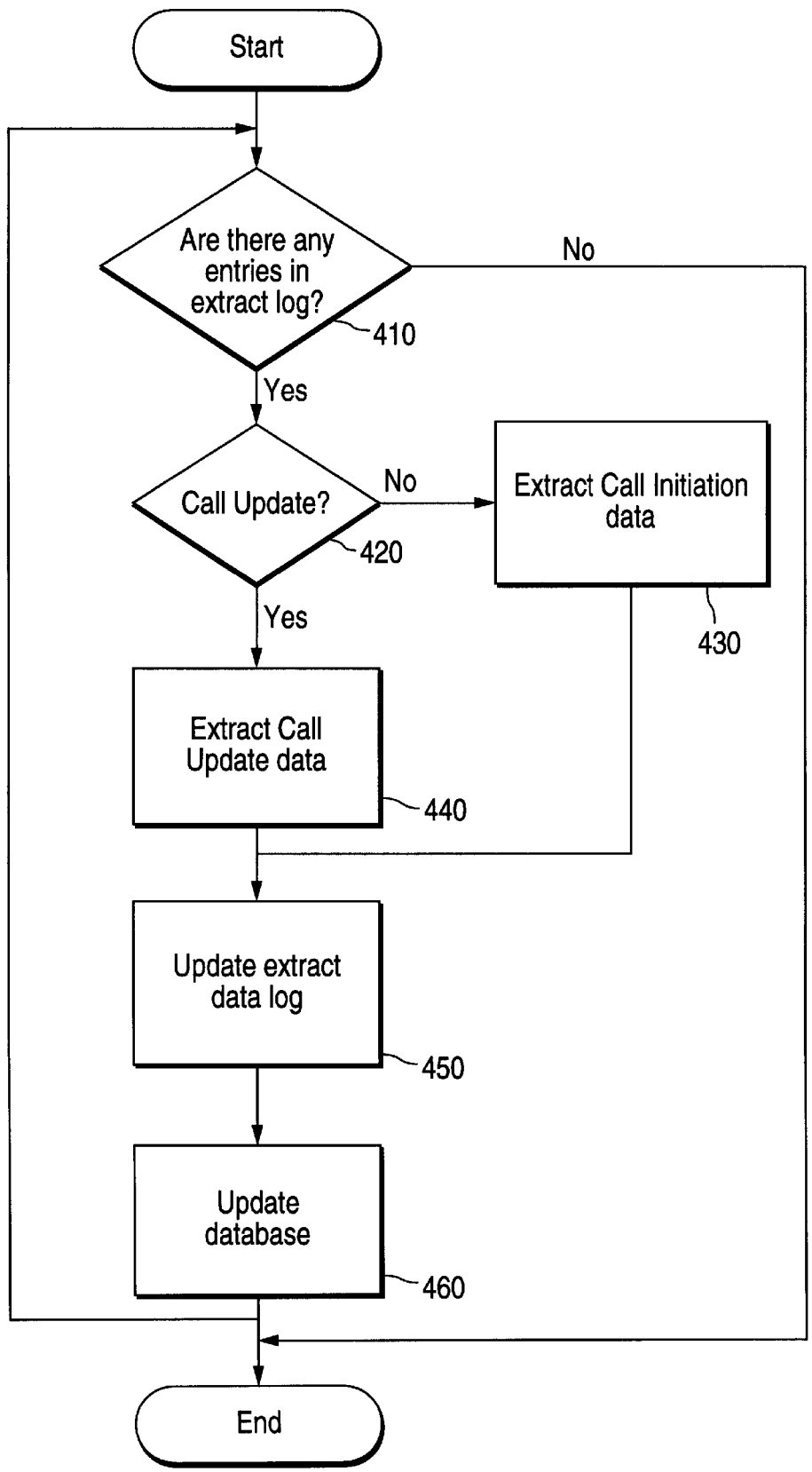
FIG. 4 is a flow diagram illustrating the operation of Extract server 208 of FIG. 2A.

The operation of Extract server 208 (FIG. 2A) is summarized in FIG. 4. First, stage 410 determines whether there are any entries in the extract log, in which case the operation proceeds to stage 420; otherwise, the operation terminates. Stage 420 then determines whether the data has been extracted as part of a Call Update operation, in which case the data required for a Call Update operation for the business partner specified by the extract log is extracted from the database in stage 440; otherwise (i.e., if the data has been extracted as part of a Call Initiation operation), the data required for a Call Initiation operation is extracted from the database in stage 430. The extract data log is then updated in stage 450. Those skilled in the art will appreciate that any method known in the art can be used to update the extract log. For example, in some embodiments the data is simply removed from the log, while in other embodiments a value is entered in a specific field of the log to indicate that the data has been extracted. Finally, the database is updated in stage 460 to indicate that the data has been extracted.

Those skilled in the art will appreciate that Extract server 208 (FIG. 2A) can be implemented by any suitable computer process running on a computer system and performing the operation of FIG. 4. For example, in one embodiment of the invention Extract server 208 is implemented by a daemon automatically executed by the Solaris operating system. As daemon programs are well known to those skilled in the art, they are not further discussed herein. To ensure continuous execution of Extract server 208, a cron process periodically checks to ensure that the daemon implementing Extract server 208 is running and restarts the daemon if necessary.

Figure 5:
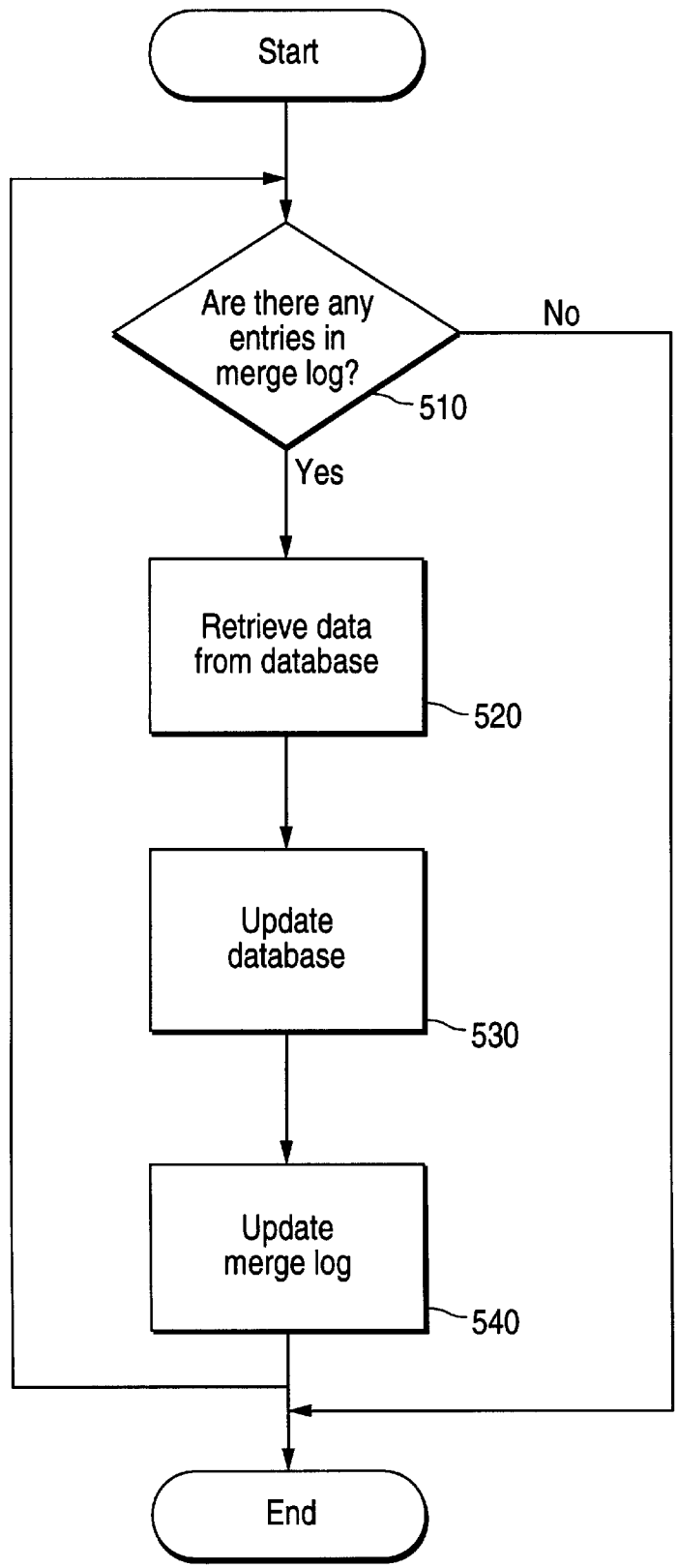
FIG. 5 is a flow diagram illustrating the operation of Merge server 308 of FIG. 3A.

The operation of Merge server 308 (FIG. 3A) is summarized in FIG. 5. First, stage 510 determines whether there are any entries in Merge log 307 (FIG. 3A), in which case the data stored in the database that is to be updated with the data received from the second computer system is retrieved from the database in stage 520; otherwise, the operation terminates. In stage 530, the data retrieved from the database is updated with the data received from the second computer system and the updated data is stored back into the database. In stage 540, the Merge log 307 is updated to indicate that the data has been merged into the database. Stages 510–540 are then repeated until all of the entries in the Merge log 307 have been processed.

Those skilled in the art will appreciate that Merge server 308 (FIG. 3A) can be implemented by any suitable computer process running on a computer system and performing the operation of FIG. 5. For example, in one embodiment of the invention Merge server 308 is implemented by a daemon automatically executed by the Solaris operating system. To ensure continuous execution of Merge server 308, a cron process periodically checks to ensure that the daemon implementing Merge server 308 is running and restarts the daemon if necessary.

Figure 6:
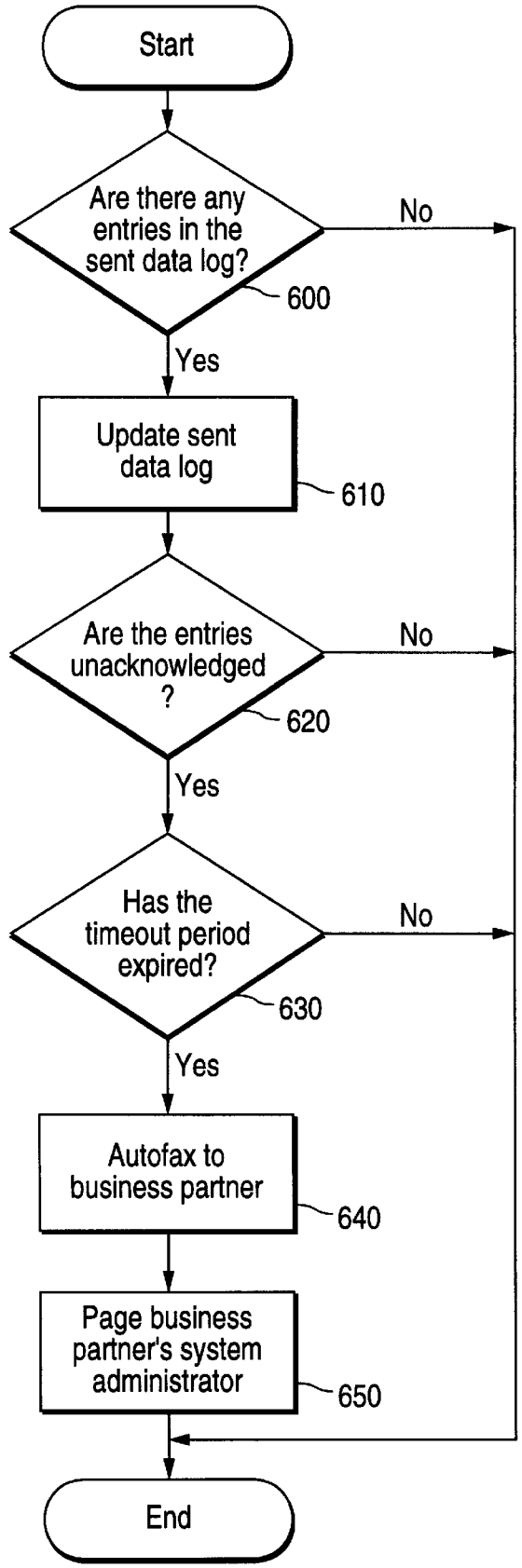
FIG. 6 is a flow diagram illustrating the operation of Ack-Fax server 209 of FIG. 2A.

The operation of Ack-Fax server 209 (FIG. 2A) is summarized in FIG. 6. First, stage 600 determines whether there are any entries in the sent data log, in which case the sent data log is updated in stage 610; otherwise, the operation terminates. Stage 620 then determines whether any of the entries in the sent data log have not been acknowledged by the second computer system, in which case the operation proceeds to stage 630; otherwise the operation terminates. Stage 630, in turn, determines whether a predetermined period of time has elapsed since the data corresponding to the entry was sent to the second computer system, in which case the operation proceeds to stage 640; otherwise the operation terminates. In stage 640, the data is automatically transmitted to the business partner via facsimile. Finally, in stage 650 the system administrator of the second computer system is paged to signal that the data transfer has been retransmitted via facsimile.

Those skilled in the art will appreciate that Ack-Fax server 209 (FIG. 2A) can be implemented by any suitable computer process running on a computer system and performing the operation of FIG. 6. For example, in one embodiment of the invention Ack-Fax server 209 is implemented by a daemon automatically executed by the Solaris operating system. To ensure continuous execution of Ack-Fax server 209, a cron process periodically checks to ensure that the daemon implementing Ack-Fax server 209 is running and restarts the daemon if necessary.

Furthermore, any suitable program known in the art can be used to transmit the data to the business partner via facsimile. For example, in one embodiment of the invention the ISOFAX program, available from Bristol Group, Ltd. of Larkspur, Calif., is used to transmit the data to the business partner.

Solaris and SOTOOL are trademarks of Sun Microsystems, Inc. of Mountain View, Calif., MENTOR is a trademark of Sterling Software, Inc. of Concordia, Calif., and TEMPLAR is a registered trademark of Premenos, Corp. of Dublin, Ohio. ISOFAX is a trademark of Bristol Group, Ltd. of Larkspur, Calif.

Embodiments described above illustrate but do not limit the invention. In particular, the invention is not limited by any particular formatting and encryption techniques. For example, some embodiments use formats other than ANSI X12 for formatting the data extracted from the database and encryption standards other than DES and RSA. Furthermore, the invention is not limited to any number of computers connected to the global network. Other embodiments and variations are within the scope of the invention, as defined by the following claims.

We claim:

1. A method of performing reliable data transfer operations over a global computer network, the method comprising:

transmitting data stored on a first computer system connected to the global computer network to a second computer system connected to the global computer network;

sending a receipt acknowledgment signal from the second computer system to the first computer system upon receiving the data on the second computer system;

monitoring acknowledgment signals received by the first computer system to determine whether the data has been received by the second computer system; and automatically transmitting the data via facsimile upon determining that the data has not been received by the second computer system.

2. The method of claim 1, further comprising:

automatically transmitting a paging signal upon determining that the data has not been received by the second computer system.

3. The method of claim 1, wherein data receipt is acknowledged in real-time.

4. A computer system for performing reliable data transfer operations, the computer system comprising a first programmed computer and a second programmed computer connected to a global computer network, the first computer comprising instructions for:

transmitting data stored on the first computer connected to the global computer network to the second computer connected to the global computer network;

monitoring acknowledgment signals received by the first computer to determine whether the data has been received by the second computer; and automatically transmitting the data via facsimile upon determining that the data has not been received by the second computer.

5. The computer system of claim 4, wherein the second programmed computer further comprises instructions for:

receiving the data on the second computer connected to the global computer network; and sending a receipt acknowledgment signal from the second computer to the first computer upon receiving the data on the second computer.

6. The computer system of claim 4, wherein the first programmed computer further comprises instructions for:

automatically transmitting a paging signal upon determining that the data has not been received by the second computer.

7. A computer-readable medium storing a computer program, the computer program comprising instructions for:

transmitting data stored on a first computer system connected to a global computer network to a second computer system connected to the global computer network;

monitoring acknowledgment signals received by the first computer system to determine whether the data has been received by the second computer system; and automatically transmitting the data via facsimile upon determining that the data has not been received by the second computer system.

8. The computer-readable medium of claim 7, further comprising instructions for:

automatically transmitting a paging signal upon determining that the data has not been received by the second computer system.

9. The computer-readable medium of claim 7, further comprising instructions for:

receiving the data on the second computer system connected to the global computer network; and sending a receipt acknowledgment signal from the second computer system to the first computer system upon receiving the data on the second computer system.

* * * * *

UNITED STATES PATENT AND TRADEMARK OFFICE
CERTIFICATE OF CORRECTION

PATENT NO. : 5,983,276 Page 1 of 1
DATED : November 9, 1999
INVENTOR(S) : Cynthia F. Beckett, Deepak Alur, Mats Jansson and Virginia C. Hyde It is certified that error appears in the above-identified patent and that said Letters Patent is hereby corrected as shown below:

<u>Column 4,</u>
Lines 9 through 22, please replace the paragraph with the following rewritten paragraph:

-- Fig. 2A illustrates the functional components of a data transfer module of the computer system used in the outbound portion of the data transfer operation of Fig. 1B. The data transfer module has a call management system 200, a translation module 210, an encryption module 220, a sendmail module 230 and an ISO fax module 240. The call management system 200, in turn, has a CMSDB database 201, an SOTOOL module 203, an EVIL (Edit Validation Interpretive Language) module 205, and Extract to Q module 206, CI/CU files 207, an Extract server 208 and a Ack-Fax Server 209. The translation module 210 has a Mapping/Translation module 213, X12.143 files 216 and data translations files 219. Finally, encryption module 220 has encryption/ MIME module 224 and MIME mail file 228. The operation of these modules is set forth below.

Signed and Sealed this

Second Day of July, 2002

*Attest:*

*Attesting Officer*

JAMES E. ROGAN
*Director of the United States Patent and Trademark Office*